(12) United States Patent
Wagner et al.

(10) Patent No.: US 9,925,727 B2
(45) Date of Patent: Mar. 27, 2018

(54) METHOD FOR PRODUCING COMPONENTS FROM FIBER-REINFORCED COMPOSITE MATERIAL

(71) Applicants: Karl Wagner, Salzburg (AT); Sebastian Schmitz, Salzburg (AT)

(72) Inventors: Karl Wagner, Salzburg (AT); Sebastian Schmitz, Salzburg (AT)

(73) Assignee: Mubea Carbo Tech GmbH, Salzburg (AT)

( * ) Notice: Subject to any disclaimer, the term of this patent is extended or adjusted under 35 U.S.C. 154(b) by 630 days.

(21) Appl. No.: 14/384,136

(22) PCT Filed: Feb. 26, 2013

(86) PCT No.: PCT/EP2013/053811
§ 371 (c)(1),
(2) Date: Sep. 9, 2014

(87) PCT Pub. No.: WO2013/131781
PCT Pub. Date: Sep. 12, 2013

(65) Prior Publication Data
US 2015/0050485 A1 Feb. 19, 2015

(30) Foreign Application Priority Data
Mar. 9, 2012 (CH) ........................... 336/12

(51) Int. Cl.
*B29C 70/30* (2006.01)
*B32B 27/08* (2006.01)
(Continued)

(52) U.S. Cl.
CPC ............ *B29C 70/30* (2013.01); *B29C 43/146* (2013.01); *B32B 27/08* (2013.01); *B32B 27/12* (2013.01); *B32B 37/02* (2013.01); *B29C 65/48* (2013.01); *B29C 66/301* (2013.01); *B29C 66/721* (2013.01); *B29C 66/723* (2013.01);
(Continued)

(58) Field of Classification Search
CPC ..................................................... B29C 70/30
See application file for complete search history.

(56) References Cited

U.S. PATENT DOCUMENTS 4,587,160 A 5/1986 Williams et al.
5,506,029 A * 4/1996 Hara ................. B29C 45/14786
428/120

(Continued)

FOREIGN PATENT DOCUMENTS

DE 103 09 811 A1 10/2003
DE 102 58 630 A1 7/2004
(Continued)

*Primary Examiner* — Benjamin A Schiffman
(74) *Attorney, Agent, or Firm* — Pauley Erickson & Kottis

(57) ABSTRACT

The invention relates to a method for producing a component (9) from fiber-reinforced composite material. In a first step, a mold (1) is provided and, in a second step, a surface layer (3) is introduced into a cavity (2) of the mold (1). In a further step, a fiber layer (4) is applied to the surface layer (3) and is cured together with the surface layer (3) to form a first part (5). Afterwards, the first part (5) is subjected to a check. If the check proceeds positively, a carrier structure (8) is connected operatively to the first part (5).

19 Claims, 1 Drawing Sheet

(51) Int. Cl.
    *B32B 27/12*     (2006.01)
    *B29C 43/14*     (2006.01)
    *B32B 37/02*     (2006.01)
    *B29C 65/00*     (2006.01)
    *B29C 65/48*     (2006.01)

(52) U.S. Cl.
    CPC ......... *B29C 66/727* (2013.01); *B32B 2262/00* (2013.01); *B32B 2305/08* (2013.01); *B32B 2607/00* (2013.01); *Y10T 428/24995* (2015.04)

(56) References Cited

U.S. PATENT DOCUMENTS

| | | | |
|---|---|---|---|
| 6,235,228 B1 * | 5/2001 | Nicholl | B29C 37/0032 |
| | | | 264/255 |
| 7,846,366 B2 | 12/2010 | Iobst et al. | |
| 8,057,622 B2 * | 11/2011 | Wagner | B29C 70/086 |
| | | | 156/214 |
| 9,486,949 B2 * | 11/2016 | Evans | B60N 2/68 |
| 2004/0018350 A1 | 1/2004 | Hilligoss | |
| 2005/0227080 A1 * | 10/2005 | Horsting | B29C 37/0032 |
| | | | 428/411.1 |
| 2008/0038569 A1 * | 2/2008 | Evans | B60N 2/68 |
| | | | 428/474.9 |
| 2011/0262703 A1 * | 10/2011 | Legler | B29C 70/086 |
| | | | 428/156 |

FOREIGN PATENT DOCUMENTS

| | | |
|---|---|---|
| DE | 10 2008 035 918 A1 | 2/2010 |
| EP | 0 365 414 A2 | 4/1990 |
| EP | 1 043 138 A1 | 10/2000 |
| EP | 1 885 547 | 2/2008 |
| WO | WO 03/080310 A1 | 10/2003 |
| WO | WO 2006/122987 A2 | 11/2006 |
| WO | WO 2008/061661 A1 | 5/2008 |
| WO | WO 2009/071118 A1 | 6/2009 |
| WO | WO 2010/008599 A1 | 1/2010 |

* cited by examiner

METHOD FOR PRODUCING COMPONENTS FROM FIBER-REINFORCED COMPOSITE MATERIAL

BACKGROUND OF THE INVENTION

Field of the Invention

The invention falls within the field of methods for producing components from composite materials.

Discussion of Related Art

The use of composite materials allows for the production of components with high strength and high rigidity compared with other lightweight materials. At the same time, fiber-reinforced composite materials in particular have a unique, characteristic appearance which is felt to be aesthetically pleasing and deemed a necessary feature for high-quality composite components.

DE102008035918A1 held by Bayer MaterialScience and Webasto AG was published in 2008 and discloses a method for producing a composite component. In this method, a decorative composite and stability-enhancing structural composite are produced at separate locations and then assembled by means of an interconnecting layer. The separate construction and curing of the two composite parts supposedly means the production time can be cut. The decorative composite consists of at least one support layer and at least one coloring layer. The structural composite consists of at least one top layer and a spacer. The decorative composite is not part of the supporting structure but rather serves decorative functions.

US7846366B2 held by GM Global Tech Operations Inc. was published in 2008 and describes compression molding cosmetic panels from fiber-reinforced composite materials. For this purpose, in a first step fiber mats are placed together with a curing resin into a first molding tool and, when the tool is closed, preformed and cured in part under the influence of pressure and heat. Then the component is brought into the final shape and cured in full in a second mold under higher pressure and higher temperatures. For shaping the component surface, the second molding tool has a higher quality surface finish than the first molding tool. The fibers are visible from the exterior.

U.S. Pat. No. 4,587,160 held by Ferro Corporation was published in 1986 and deals with the production of surfaced-coated plastics parts. An electrically conductive paint is applied to the surface of a hot mold by electrostatic adhesion. Then plastics material is introduced into the mold, the mold is closed and the surface layer shaped together with the plastics material.

EP0365414B1 held by Hutchinson was published in 1990 and discloses a method for producing a body part for motor vehicles. In this method, first of all a liquid paint is applied to the walls of a casting mold. In particular, provision is made for use of an electrically conductive paint which automatically detaches itself from the surface layer, so that later there is still the option of carrying out electrostatic powder coatings. Then a reinforcing element, such as a glass-fiber mat is deposited in the mold and a polymerizing material is injected therein, said material acting as a matrix for the reinforcing element and simultaneously interconnecting to the paint layer. In this manner, the production of components with a high-quality surface finish is supposedly possible.

EP1043138B1 (or US6235228B1) held by Morton International Inc. was published in 2000 and discloses a method for coating a molded object. For this purpose, a thermosetting powder mixture of an unsaturated polyester resin, a cross-linking prepolymer and a thermal initiator is applied to the surface of a molding tool. Then the surface of the molding tool coated with the powder is heated, which prompts the powder to transform into a continuous film that coats the molding tool surface and ultimately results in curing of said film. Alternatively, the molding tool is also heated prior to application of the powder mixture, so that the powder mixture liquefies upon contact with the surface. Then, in the molding tool, the actual component body is constructed on the cured powder coating. A filler resin, optionally interspersed with glass fibers, or layers of glass-fiber mats can be used. Once the component body has been cured, it is integrally interconnected to the powder coating and removed from the molding tool.

WO10008599A1 held by New England Catalytic Technologies Inc. was published in 2010 and discloses a method for the in-mold application of a powder coating. This method is intended to allow for a uniform, in-mold powder coating of a large component, without the molding tool used having to be heated beyond the melting point of the coating powder prior to introduction thereof. The surface of the cavity used is electrically conductive and earthed. The surface coating is produced by the surface coating powder being applied to the cavity wall at the same time as an electrically conductive and mainly carbon-fiber-containing fibrous medium and as an, optionally fibrous, reinforcing medium, the electrically conductive medium being in electrical contact with the electrically conductive surface of the cavity. Once applied, the surface coating is then heated to achieve thermosetting and is pressurised.

WO08061661A1 held by Novation S.p.A. was published in 2008 and discloses a method for producing components from fiber-reinforced plastics materials. In this method, first of all a molded main body is produced in a closed mold by injecting a thermosetting matrix system into a first type of fiber and curing (resin transfer molding, hereinafter "RTM"). After removal from the mold, at least one layer of a pre-impregnated fiber product (the "prepreg") is laminated as a mechanical reinforcement on the molded main body and cured, resulting in a solid interconnection between the main body and the prepreg. Through the use of an optionally thermoplastics film applied to the component surface in conjunction with the prepreg, a high-quality surface finish can be achieved in the region of the visible surface component, which finish is suitable for any autoclaved component based solely on the prepreg.

WO03080310A1 held by Menzolit Fibron GmbH was published in 2003 and discloses a method for producing a painted, fiber-reinforced component. For this purpose, a film is preformed in a molding tool and assigned the surface condition desired for the component and optionally a color. Then, in a molding tool, reinforcing plies of fiber-reinforced plastics material are placed onto the side of the film that is not intended to be the component surface. By means of curing a thermosetting matrix system or of melting and subsequently cooling a thermoplastics matrix, the component to be produced is then molded.

EP1885547B1 held by Mubea Carbo Tech GmbH was published in 2006 and discloses a method for producing a coated composite product. For this purpose, in an auxiliary molding tool, a film-like basic shape is produced which corresponds at least in part to the surface shape of the component to be produced. Then this basic shape is removed from the auxiliary molding tool and reinforcing plies applied thereto. The basic shape is then transferred together with the reinforcing plies into a production tool, where the reinforcing plies are bound by a matrix system and then cured.

Thereupon the basic shape is removed from the mold together with the reinforcing plies and can be finished. The basic shape can be assigned various functions under this patent specification; for example, the basic shape might be a high-quality component surface, provide shatter resistance, protect the surface of the production tool from damage, be strippable or protect the surface of the component from dirt until the point of finishing.

SUMMARY OF THE INVENTION

For economic reasons, with sophisticated production lines it is traditionally sought after each production step to eliminate defective intermediate products, so that these do not cause any unnecessary additional systemic, wage or material costs in subsequent production steps and thereby achieving a low elimination rate at the end of the production line. When producing composite components, however, this type of procedure for reducing elimination rates at the end of the production line often proves difficult. One of the main reasons for this is that, generally speaking, when producing high-quality composite components, what is known as an integral construction is sought. This production concept seeks to produce as many functional elements of a product as possible simultaneously in a single production operation, so as, for example, to cut later assembly costs. In addition, in the case of transfer molding for example (known as "resin transfer molding", hereinafter "RTM"), this concept allows for cost-effective production of high-quality components which are easily reproducible in middle and mass production. However, since this does away with multiple production steps involved in conventional (sophisticated) construction, this also means that successive checks on intermediate products are no longer possible. Although it is indeed possible to reduce the risk of a defective component being produced in such an integrated method step as a result of a large number of measures, this also leads to increased production costs, for which reason a compromise normally has to be found between risk minimization and additional costs.

Particularly problematic are categories of defects which cannot be corrected and at the same time can be neither efficiently prevented not detected before completion of the method step. Irregularities in the region of the component surface fall into this category, and there are many known types, one example being local differences in the thicknesses of the surface finish. These differences cause an irregular surface sheen and can result in reinforcement fibers penetrating the paint surface. A second type is known from the use of thermosetting matrix systems, with which gases can be produced during curing which are visible as bubbles inside the matrix or as small holes (known as "pin holes") on the component surface of the finished component. A third type is the undesirable creation of large pores as liquid matrix systems are fed into cavities. Irregularities in the arrangement of fibers constitute a fourth type. Known examples include, inter alia: irregular draping of the planar semi-finished product, in particular in the case of fabric, and the undesirable displacement of fibers during the introduction of matrix systems, in particular in the case of RTM, crease formation.

In some cases it is possible to remedy relatively small defects in the component surface by smoothing and/or repainting the surface finish. Such reworking is, however, hardly economical for medium- and mass production and, what is more, in many cases the quality of the surface finish obtained falls short of the aesthetic requirements placed by end consumers on the component. Furthermore, individual reworking operations entail high costs and are time-consuming. From a production perspective, this is also problematic primarily because this elimination of components due to defects in their surface condition does not occur until a large share of the production costs has already been incurred. This not only directly increases the costs per defect-free component, but it also reduces production capacities. The disposal of finished components solely on the ground of small irregularities in the surface structure is therefore problematic from an environmental perspective as well.

It is therefore an object of the present invention to disclose a method for producing components from fiber-composite materials which makes it possible to improve quality and reduce elimination rates.

In one embodiment of a method according to the invention, the production of the component body is divided into production of at least one first part, comprising visible faces of relevance for the optical appearance of the component, and at least one second part, which either alone or in conjunction with the at least one first part is responsible for the stability of the component (support structure). Between these two method steps there is the option of subjecting the visible surfaces to a thorough check. For this purpose, the first part can be removed from a production mold.

In contrast to conventional production in which a component is produced in an integrated manner and the visible faces can be checked only once the component is complete, the method according to the invention allows for much earlier intervention, or correction, in that the visible face is produced for the most part separately from the support structure. Interconnecting to a supporting part does not take place until a later point in time. Advantageously, the first part is constructed as a relatively thin part comprising little material. Another advantage is that rapid heating and cooling is possible as a result of the generally comparatively low weight, and this can have a positive effect on production efficiency.

Generally speaking, the first part is produced in a cavity of a molding tool. In this process one or more plies of fibers later directly or indirectly forming a visible face are applied directly to a cavity wall. The ply of fibers can have either a single- or multilayered construction and be impregnated with a matrix (prepreg) and/or incorporated dry. Alternatively or additionally, the cavity wall can also be coated prior to application of the ply of fibers, for example it is possible to provide the cavity wall with a paint which later establishes a functional interconnection with the ply of fibers. Prior to deposition of the fibers, the coating can be cured at least in part and may additionally be subjected to other treatment steps. Furthermore, it is possible to cover the cavity wall with a material layer before the ply of fibers is applied. The material layer may consist, for example, of a preformed (thermo-) plastics film. The plastics film can either remain on the component or be detached therefrom later.

Post-production, the first part generally has only limited structure-supporting properties, which have to be selected such that the first part can be handled without incurring damage, for example in order to carry out a quality check on the visible faces or other treatments. Once the first part has sufficient structural stability, it is (if necessary) removed from the molding tool and, for example, its visible faces are examined for defects. If this intermediate product meets specified requirements, in particular those relating to its optical appearance, then it remains in the production process and is functionally interconnected in one or more subsequent production steps to a support structure to increase its mechanical strength.

In a method according to the invention, contrary to standard practice, integrated production of the component body is therefore deliberately avoided. This difference according to the invention means that the risky production of the surface structure of the product can be separated from the rest of production. On the one hand this separation allows for an efficient reduction in the risk of irregularities appearing in the surface structure, since a production method optimized solely for the production of the surface structure can be used. On the other hand this difference also allows for an early check on the quality of the surface finish, thereby making it possible for defective surface structures to be eliminated prior to completion of the product. It has been found that this allows both the costs involved in producing the product and elimination volumes to be cut, while at the same time allowing the quality of the surface finish of the product to increase.

A method according to the invention has the following advantages over conventional methods:
 a) Rates at which components are eliminated at the end of the production line can be reduced, thus reducing both production costs and the environmental impact of production.
 b) Cycle times in expensive dimensionally accurate, form-fitting and surface-specific cavities can be reduced if required.
 c) Changes to the dimensions of the component during production, in particular by shrinking, can be accounted for and compensated if required.
 d) Formation of an in-mold surface layer on the component allows for an efficient use of films or powder coatings, thus leading to a considerable improvement in industrial hygiene compared with the use of liquid paints.
 e) The method allows components to be tailored individually to customer requirements while maintaining a standard high-quality surface finish.
 f) The method is also suited to functional integrations, in particular rear foaming for heat and noise insulation.

In one embodiment, a method according to the invention for producing a fiber-reinforced component comprises the following method steps: (a) providing a molding tool comprising a shaping cavity; (b) where necessary, applying a surface layer to at least one wall of the cavity so that said layer adheres temporarily to said wall; (c) directly or indirectly applying a first ply of fibers to the surface layer temporarily adhering to the cavity wall; (d) functionally interconnecting the surface layer and the first ply of fibers, and curing the first ply of fibers; (e) detaching the surface layer from the cavity wall; (f) removing an intermediate product consisting of the first ply of fibers and the surface layer functionally interconnected thereto from the cavity; (g) checking the intermediate product, for example for flaws or other criteria; (h) introducing the checked intermediate product into the same or another cavity; (i) applying a support structure to the intermediate product; (j) functionally interconnecting the intermediate product to the support structure; (k) removing the finished component from the cavity. The cavity of the molding tool used can have an electrically conductive surface which improves the temporary adhesion of the surface coating. The surface coating can have a multilayered construction. At least one of the in-mold plies of the surface layer can have a different color to the first ply. At least one ply of the surface layer might be a powder prior to introduction into the cavity. At least one ply of the surface layer might be a liquid prior to introduction into the cavity. If desired, one ply of the surface layer may have a not continuous construction. The aggregate state of the surface layer can be modified at least temporarily by electromagnetic radiation prior to deposition of the first ply of fibers. The support structure may be a fiber-composite component and/or produced from a homogenous polymer, for example by injection molding. The surface layer can be detached gently from the cavity wall by feeding a gas and/or a liquid between the surface layer and the cavity wall. The check may be either a direct or indirect visual examination. Depending on the field of application, the ply of fibers may be formed of carbon fibers and/or glass fibers and/or aramid fibers and/or polymer fibers and/or metal fibers and/or natural fibers and/or synthetic fibers. The plies of fibers can be fixed by curing a matrix system that is either injected between the fibers or already present at this location. If required, the surface layer can be cured at least in part prior to deposition of the first ply of fibers. Depending on the field of application, the support structure may be constructed as a fiber-composite component and consist of one or more plies of fibers. The support structure may comprise elements/means which enhance loadability, for example in the form of reinforcing ribs, which are integrally formed or subsequently functionally interconnected. If required, the support structure can comprise regions made of foam and/or honeycomb, which are used to enhance the loadability or to absorb kinetic energy, for example in the event of an accident. The support structure can comprise at least one region made of homogenous plastics material, which is produced, for example, by injection molding. The support structure is advantageously functionally interconnected to the intermediate product by gluing.

BRIEF DESCRIPTION OF THE DRAWINGS

Other aspects of the invention are explained in more detail on the basis of the embodiment illustrated in the following figures, in which.

DETAILED DESCRIPTION OF THE INVENTION

Figure 1:
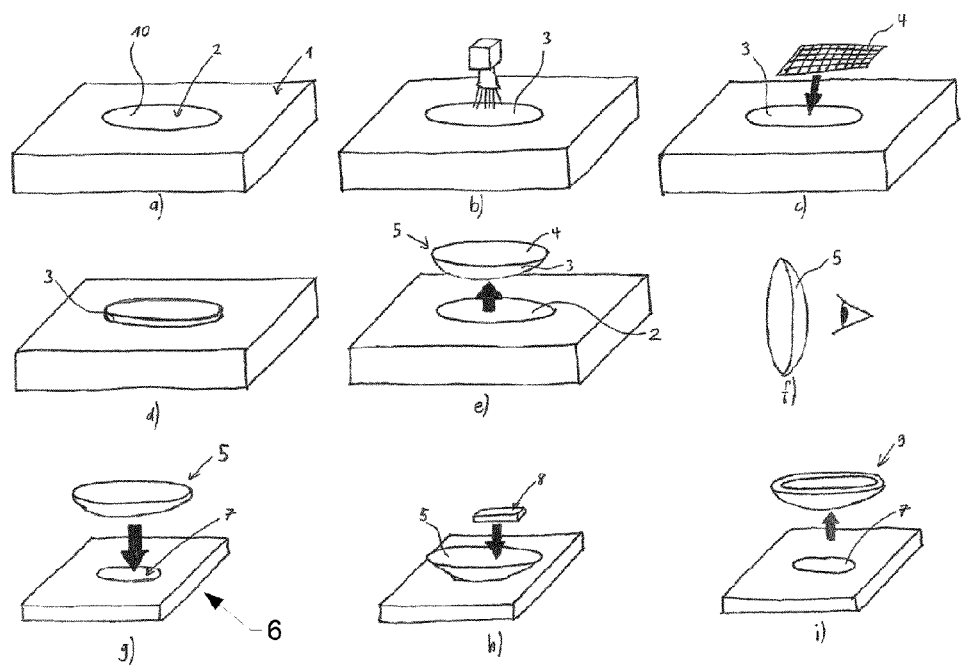
FIG. 1 shows a method according to the invention.

A method according to the invention is explained in more detail with reference to FIG. 1. Put simply, the method according to the invention shown comprises the following method steps: in a first step (cf. FIG. 1a) a molding tool 1 having a cavity 2 is provided. The cavity 2 has a shaping wall 10.

If required, as shown in FIG. 1b, a surface layer 3 is applied to the wall 10 (or to parts thereof), so that said surface adheres temporarily to said wall. Depending on the embodiment, a plurality of plies of surface layers may even be applied. The one or more surface layers 3 may consist, for example in their raw state, of a liquid and/or a powder and/or a film. Generally speaking, these reach their desired properties only as a result of processing. In one embodiment, the surface layer 3 is treated by the action of electromagnetic waves prior to application of a first ply of fibers. In particular, provision is made for the use of radiation at wavelengths in the infrared or ultraviolet range. The use of microwaves or inductive heating are further possibilities.

In another step (cf. FIG. 1c) a first ply of fibers 4 is applied to the surface layer 3 temporarily adhering to the cavity wall 10. For example, carbon fibers, glass fibers, aramid fibers, polymer fibers, metal fibers (e.g. steel fibers) or natural fibers can be used for this purpose, which are visible either in full or in part through the surface layer 3 from the exterior. It is possible to apply additional plies of fiber to the first ply of fibers. The surface layer 3 and the at least one first ply of fibers 4 are then functionally interconnected to one another. Moreover, the surface layer and the first ply of fibers are cured to the extent that at least the combination of the two layers has a certain inherent stiffness. The inherent stiffness should be sufficiently great for easy handling of the intermediate product.

Then, as shown schematically in FIG. 1d, the first part 5 (intermediate product) consisting of the surface layer 3 and the layer of fibers 4 functionally interconnected thereto is separated from the cavity wall 10 and, as shown in FIG. 1e, removed from the cavity 2. Advantageously, said part has a substantially unchanging, constant thickness which, compared with the end product, is relatively thin and consists substantially of only the surface layer and the ply of fibers. Owing to the low, uniform material thickness, checking procedures can be applied simply, which cannot be used quite so simply with components comprising, for example, ribs and other reinforcing structures.

Then the intermediate product 5, as shown in FIG. 1f, can be examined for, for example, optical flaws or other criteria. The checks may comprise the following procedures in particular: visual checks, mechanical checks, checks on fiber distribution, checks on the continuity of the homogeneity of the surface layer, etc.

In a subsequent step (cf. FIG. 1g) the intermediate product 5 is introduced into the same cavity or a cavity 7 of another tool 11. In this second cavity 7, a support structure 8 is functionally interconnected to the first part (intermediate product) 5. The support structure may consist, for example, of single- or multilayered fiber-composite material, injection-molded plastics material, a foam or honeycomb structure, or a combination thereof. The support structure can be either planar or comprise reinforcing ribs. It can be functionally interconnected to the first part either directly or via an intermediate layer. Other possibilities include depositing parts between the first part and the support structure which assume a particular function; for example it is possible to deposit an identification, such as an imprinted code or RFID tags that are readable from the exterior, which are used for the purposes of quality assurance, forgery prevention and/or component identification.

Another advantage resides in the fact that with the use of a plurality of molding tools, these can be used to optimum capacity. For example, the molding tools can be isothermally operated at optimal temperatures for each processing step. Protracted heating and cooling operations are no longer required.

Figure 2:
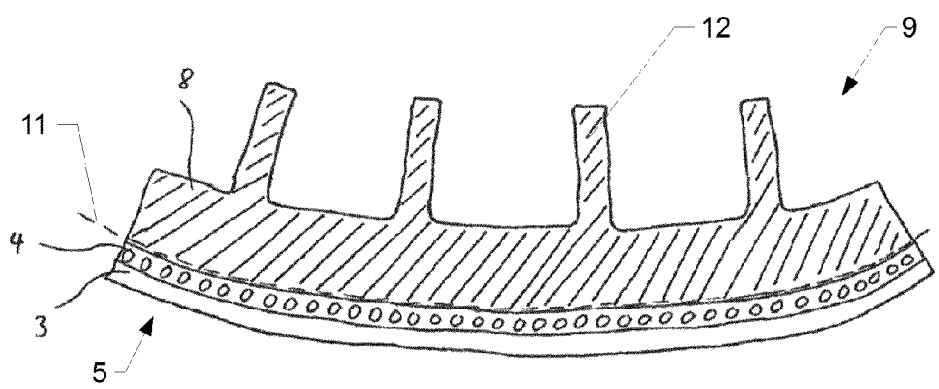
FIG. 2 schematically shows a cross section through a product produced by the method according to the invention.

FIG. 2 shows schematically a cross section through a component 9 according to the invention involving fiber-reinforced plastics material. The component 9 comprises an outer surface layer 3, behind which a ply of fibers 4 is arranged. The surface layer 3 and the ply of fibers 2 are produced together (first part 5) and can then be removed from the molding tool 1 (cf. FIG. 1) for a quality check. In some applications, the surface layer 3 can even be dispensed with or applied at a later point in time. If desired, the quality check can alternatively or additionally be carried out in the molding tool as well. In a second step a support structure 8 is functionally interconnected to the first part 5. The functional interconnection produces a functional interconnection face 11, shown here schematically as dotted line 11. The support structure 8 may be one or more plies of fiber-reinforced plastics material and/or a foam and/or honeycomb and/or a structure made of thermoplastics material. To obtain an optimal functional interconnection between the first part 5 and the support structure 8, the support structure 8 is generally constructed on the functional interconnection face 11. The support structure may be constructed from fiber-reinforced plastics material of one or more layers. Other types of construction are possible. For example, it is possible, alternatively or additionally, to produce the support structure 8 by injection molding. For this purpose, the first part 5 can be deposited in the one injection mold. In the example shown, the support structure 8 comprises reinforcing ribs 12. Other elements enhancing loadability are also possible. Advantageously, the first part 5 has a comparatively planar configuration, that is to say with a low thickness. The "three-dimensional" elements projecting from the plane are advantageously integrated into the support structure 8.

The invention claimed is:

1. A method for producing a fiber-reinforced component (9), comprising the following method steps:
   a. providing a molding tool (1) having a shaping cavity (2);
   b. applying a surface layer (3) to at least one wall (10) of the shaping cavity (2) so that the layer adheres temporarily to the wall;
   c. applying a single- or multilayered ply of fibers (4) to the surface layer (3) temporarily adhering to the wall (10);
   d. functionally interconnecting the surface layer (3) and the ply of fibers (4), and curing the first ply of fibers (4);
   e. detaching the surface layer (3) from the wall (10);
   f. removing an intermediate product (5) including the ply of fibers (4) and the surface layer (3) functionally interconnected thereto from the cavity (2);
   g. checking the intermediate product (5);
   h. introducing the checked intermediate product (5) into the cavity (2) or another cavity (7);
   i. applying a support structure (8) to the intermediate product (5);
   j. functionally interconnecting the intermediate product (5) to the support structure (8) to form the component (9);
   k. removing the component (9) from the cavity (2) or the another cavity (7).

2. The method according to claim 1, wherein the cavity (2) of the molding tool includes an electrically conductive surface (10) improving the temporary adhesion of the surface layer (3).

3. The method according to claim 1, wherein the surface layer (3) includes a multilayered construction.

4. The method according to claim 3, wherein at least one ply of the multilayered construction of the surface layer (3) includes a different color from another ply.

5. The method according to claim 1, wherein at least one ply of the surface layer (3) comprises a powder prior to introduction into the cavity.

6. The method according to claim 1, wherein at least one ply of the surface layer (3) is a liquid prior to introduction into the cavity (2).

7. The method according to claim 1, wherein at least one ply of the surface layer (3) is not continuous.

8. The method according to claim 1, wherein the aggregate state of the surface layer (3) is modified at least temporarily by electromagnetic radiation prior to deposition of a first ply of fibers (4).

9. The method according to claim 1, wherein the surface layer (3) is cured at least in part prior to deposition of a first ply of fibers (4).

10. The method according to claim 1, wherein the support structure (8) is constructed as a fiber-composite component.

11. The method according to claim 10, wherein the support structure (8) comprises one or more plies of fibers.

12. The method according to claim 10 wherein the support structure (8) comprises a foam and/or a honeycomb structure.

13. The method according to claim 1, wherein the support structure (8) comprises at least one region made of homogenous plastics material.

14. The method according to claim 13, wherein at least some regions of the support structure (8) are produced by injection molding.

15. The method according to claim 1, wherein the support structure is functionally interconnected to the intermediate product by gluing.

16. The method according to claim 1, wherein the surface layer is detached from the cavity wall by a gas and/or a liquid being fed between the surface layer and the cavity wall.

17. The method according to claim 1, wherein the check is a direct or indirect visual examination.

18. The method according to claim 1, wherein a first ply of fibers is formed of carbon fibers and/or glass fibers and/or aramid fibers and/or polymer fibers and/or metal fibers and/or natural fibers and/or synthetic fibers.

19. The method according to claim 1, wherein one or more plies of fibers are fixed by curing a matrix system that is either injected between the fibers or already present at this location.

* * * * *